US 8,355,942 B2

(12) United States Patent
Hansknecht et al.

(10) Patent No.: US 8,355,942 B2
(45) Date of Patent: *Jan. 15, 2013

(54) SOFTWARE/HARDWARE RANKING

(75) Inventors: Douglas Joseph Hansknecht, Columbus, OH (US); Sanjay Mannan, Johns Creek, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/534,539

(22) Filed: Jun. 27, 2012

(65) Prior Publication Data

US 2012/0271672 A1 Oct. 25, 2012

Related U.S. Application Data

(63) Continuation of application No. 12/276,480, filed on Nov. 24, 2008.

(51) Int. Cl.
*G06Q 10/00* (2012.01)
(52) U.S. Cl. ...................... 705/7.11; 705/347
(58) Field of Classification Search .......... 705/7.11, 705/347
See application file for complete search history.

(56) References Cited

U.S. PATENT DOCUMENTS

| 7,197,466 | B1 | 3/2007 | Peterson et al. |
| 2008/0120120 | A1 | 5/2008 | Cirulli et al. |
| 2010/0131313 | A1 | 5/2010 | Hansknecht et al. |

OTHER PUBLICATIONS

Karl E. Wiegers; Karl Wiegers Describes 10 Requirements Traps to Avoid; < URL: http://www.processimpact.com/articles/reqtraps.html >; [Retrieved Aug. 11, 2008]; 9 pages.
Office Action (Mail Date Aug. 17, 2011) for U.S. Appl. No. 12/276,480, filed Nov. 24, 2008; Confirmation No. 4194.
Amendment filed Oct. 26, 2011 in response to Office Action (Mail Date Aug. 17, 2011) for U.S. Appl. No. 12/276,480, filed Nov. 24, 2008; Confirmation No. 4194.
Final Office Action (Mail Date Jan. 31, 2012) for U.S. Appl. No. 12/276,480, filed Nov. 24, 2008; Confirmation No. 4194.
Request for Continued Examination and Amendment filed Mar. 15, 2012 in response to Final Office Action (Mail Date Jan. 31, 2012) for U.S. Appl. No. 12/276,480, filed Nov. 24, 2008; Confirmation No. 4194.
Notice of Allowance (Mail Date May 7, 2012) for U.S. Appl. No. 12/276,480, filed Nov. 24, 2008; Confirmation No. 4194.
Lawlis et al.; A Formal Process for Evaluating COTS Software Products; May 2001; Retrieved from the Internet: <URL: http://www.it.iitb.ac.in/~palwencha/mtp_first/lic/lic/pap1412/formal%20process%20for%20evaluating%20COTS%20software%20products.pdf>; retrieved on Aug. 8, 2011; 6 pages.
DSA Insights; Qualitative Comparison; Dec. 11, 2007; Retrieved from the Internet: <URL: http://web.archive.org/web/20071212171052/http://supportanalytics.com/blog/2007/12/qualitative-comparison/>; retrieved on Aug. 8, 2011; 5 pages.

*Primary Examiner* — Candice D Wilson
*Assistant Examiner* — Ehrin Pratt
(74) *Attorney, Agent, or Firm* — Schmeiser, Olsen & Watts; John R. Pivnichny

(57) ABSTRACT

A ranking method and system. The method includes receiving by a computing system, business requirements and associated weighting factors. The computing system receives a list of software/hardware products and associated assessment data. The business requirements are associated with product features of the software/hardware products. The computing system calculates total requirement weighting factors for the product features. The computing system stores the total requirement weighting factors.

16 Claims, 14 Drawing Sheets

| BUSINESS REQUIREMENTS | DESCRIPTION |
|---|---|
| 1.0.1 | AN AUTHORIZED USER SHALL BE ABLE TO MANAGE THOUSANDS OF FILES AND DETERMINE WHICH ARE MOST CURRENT. |
| 1.0.3 | A USER SHALL BE ABLE TO SHARE EMAILS AND ATTACHMENTS WITH THOSE WHO HAVE A NEED TO ACCESS IT. |
| 1.0.4 | ONE AUTHORIZED BUSINESS USER AT A TIME SHALL BE ALLOWED TO MAKE CHANGES TO A FILE. |
| 1.0.5 | AN AUTHORIZED BUSINESS PERSON SHALL BE ABLE TO DETERMINE WHO IS EDITING OR REVIEWING A FILE. |
| 1.0.7 | ONE VERSION OF CONTENT SHALL BE ACCESSIBLE WHILE OTHER VERSIONS ARE BEING CREATED OR MODIFIED. |
| 1.0.8 | MULTIPLE VERSIONS OF BINDERS MAY SHARE COMMON CONTENT. |
| 1.0.9 | A CONTENT GOVERNANCE FRAMEWORK SHALL BE DEVELOPED TO IDENTIFY, MAINTAIN, AND MONITOR...MISSION; ORGANIZATION; ROLE & RESPONSIBILITIES; PROCESS; MEASURES OF SUCCESS; CONTENT MODEL...FOR GS TAX DEPARTMENT CONTENT AND TAXONOMY. |

*FIG. 3*

| BUSINESS REQUIREMENT | RELATIVE WEIGHT (1, 3, OR 5) | PRIORITIZATION RATIONALE | DESCRIPTION |
|---|---|---|---|
| 1.0.1 | 3 | | AN AUTHORIZED USER SHALL BE ABLE TO MANAGE THOUSANDS OF FILES AND DETERMINE WHICH ARE MOST CURRENT. |
| 1.0.3 | 5 | | A USER SHALL BE ABLE TO SHARE EMAILS AND ATTACHMENTS WITH THOSE WHO HAVE A NEED TO ACCESS IT. |
| 1.0.4 | 3 | E-MAIL REDUCTION THROUGH INTEGRATION IS A MAJOR SOURCE OF PRODUCTIVITY IMPROVEMENT USERS ARE OVERWHELMED BY EMAIL VOLUMES WHICH INCLUDE DUPLICATES AND EMAIL THAT IS NOT RELEVANT TO THEM. | ONE AUTHORIZED BUSINESS USER AT A TIME SHALL BE ALLOWED TO MAKE CHANGES TO A FILE. |
| 1.0.5 | 3 | | AN AUTHORIZED BUSINESS PERSON SHALL BE ABLE TO DETERMINE WHO IS EDITING OR REVIEWING A FILE. |
| 1.0.7 | 3 | | ONE VERSION OF CONTENT SHALL BE ACCESSIBLE WHILE OTHER VERSIONS ARE BEING CREATED OR MODIFIED. |
| 1.0.8 | 5 | | MULTIPLE VERSIONS OF BINDERS MAY SHARE COMMON CONTENT. |
| 1.0.9 | 3 | ESSENTIAL REQUIREMENT TO SUPPORT TO BE VISION FOR VIRTUAL BINDERS | A CONTENT GOVERNANCE FRAMEWORK SHALL BE DEVELOPED TO IDENTIFY, MAINTAIN, AND MONITOR...MISSION; ORGANIZATION: ROLE & RESPONSIBILITIES; PROCESS; MEASURES OF SUCCESS; CONTENT MODEL...FOR GS TAX DEPARTMENT CONTENT AND TAXONOMY. |

| KEY FEATURES | COMPANY 1 SOFTWARE | COMPANY 2 SOFTWARE | COMPANY 3 SOFTWARE | COMPANY 4 SOFTWARE | COMPANY 5 SOFTWARE | COMPANY 6 SOFTWARE | COMPANY 7 SOFTWARE | COMPANY 8 SOFTWARE | BUSINESS REQUIREMENTS | | | | | | |
|---|---|---|---|---|---|---|---|---|---|---|---|---|---|---|---|
| CAPTURE | | | | | | | | | | | | | | | |
| SCAN IMAGE | ● | ◐ | ◐ | ● | ◐ | ◐ | ◐ | ◐ | 2.0.4 | 2.0.5 | | | | | |
| EMAIL INTEGRATION | ○ | ◐ | ◐ | ● | ◐ | ◐ | ◑ | ◐ | 1.0.3 | 2.0.1 | | | | | |
| OFFICE / EXPLORER INTEGRATION | ◐ | ◐ | ◐ | ● | ● | ◐ | ◐ | ◐ | 2.0.2 | | | | | | |
| CORE REPOSITORY | | | | | | | | | | | | | | | |
| TAXONOMY MANAGEMENT | ● | ◐ | ● | ● | ○ | ◐ | ◐ | ○ | 1.0.8 | 1.0.9 | 3.1.1 | 3.2.1 | 3.2.4 | 3.2.5 | |
| COMPOUND DOCUMENT SUPPORT | ● | ◐ | ● | ● | ◐ | ◐ | ◐ | ◐ | 3.1.4 | 9.0.2 | | | | | |
| CHECK IN/OUT & VERSION CONTROL | ◐ | ◐ | ◐ | ● | ◐ | ◐ | ◐ | ◐ | 1.0.1 | 1.0.4 | 1.0.5 | 1.0.7 | 2.0.3 | 3.1.3 | 3.1.5 5.0.2 5.0.3 |
| ACCESS CONTROL | ● | ◐ | ◐ | ● | ○ | ◐ | ◐ | ◐ | 4.0.1 | 4.0.2 | 4.0.3 | 4.0.4 | 4.0.5 | 6.1.1.4 | 7.1.5 7.6.2 7.7.1 6.1.1 |
| ARCHIVING / HIERARCHICAL STORAGE MGT | ◐ | | ◐ | ◐ | ○ | | ● | ◐ | 3.1.7 | 3.1.8 | 11.0.4 | | | | 7.7.2 |
| FEDERATION | ◐ | | | | ○ | | ● | | 7.1.7 | | | | | | 8.2.1 |
| DISTRIBUTED ARCHITECTURE | ◐ | | | | ◐ | | ◐ | | 3.1.9 | | | | | | |
| SEARCH | | | | | | | | | | | | | | | |
| FULL TEXT | ● | ◐ | ◐ | ◐ | ◐ | ◐ | ◐ | ◐ | 6.2.3 | | | | | | |
| ATTRIBUTE / INDEX BASED | ● | ◐ | ◐ | ◐ | ◐ | ◐ | ◐ | ◐ | 3.1.6 | 6.1.6 | 6.2.1 | 6.2.4 | | | |
| TEMPLATE BASED | ● | | ◐ | ◐ | ● | ◐ | ◐ | ◐ | 3.1.6 | 6.1.3 | | | | | |

| Key Features | Company 1 Software | Company 2 Software | Company 3 Software | Company 4 Software | Company 5 Software | Company 6 Software | Company 7 Software | Company 8 Software | Total Req. Weight | Business Requirements | | | | | | |
|---|---|---|---|---|---|---|---|---|---|---|---|---|---|---|---|---|
| CAPTURE | | | | | | | | | | | | | | | | |
| Scan Image | ● | ● | ● | ● | ● | ● | ● | ● | 4 | 2.0.4 | 2.0.5 | | | | | |
| Email Integration | ○ | ● | ● | ● | ◐ | ● | ◐ | ● | 8 | 1.0.3 | 2.0.1 | | | | | |
| Office/Explorer Integration | ● | ● | ● | ● | ● | ● | ● | ● | 3 | 2.0.2 | | | | | | |
| CORE REPOSITORY | | | | | | | | | | | | | | | | |
| Taxonomy Management | ● | ● | ● | ● | ● | ● | ● | ● | 18 | 1.0.8 | 1.0.9 | 3.1.1 | 3.2.1 | 3.2.4 | 3.2.5 | |
| Compound Document Support | ◐ | ● | ● | ● | ○ | ● | ● | ○ | 2 | 3.1.4 | 9.0.2 | | | | | |
| Check In/Out & Version Control | ● | ● | ● | ● | ◐ | ◐ | ● | ● | 32 | 1.0.1 | 1.0.4 | 1.0.5 | 1.0.7 | 2.0.3 | 3.1.3 | 3.1.5 |
| Access Control | ◐ | ● | ● | ● | ● | ● | ● | ● | 29 | 4.0.1 | 4.0.2 | 4.0.3 | 4.0.4 | 4.0.5 | 6.1.1.4 | 6.1.1.5 | 5.0.2 | 5.0.3 | 6.1.1 |
| Archiving/Hierarchical Storage Mgt | ◐ | ● | ● | ● | ● | ◐ | ● | ◐ | 11 | 3.1.7 | 3.1.8 | 11.0.4 | | | | |
| Federation | ● | ● | ● | ● | ○ | ● | ● | ● | 1 | 7.1.7 | | | | | | |
| Distributed Architecture | | | | | | | | | 5 | 3.1.9 | | | | | | |
| SEARCH | | | | | | | | | | | | | | | | |
| Full Text | ● | ● | ● | ● | ● | ● | ● | ● | 3 | 6.2.3 | | | | | | |
| Attribute/Index Based | ● | ● | ● | ● | ● | ● | ● | ● | 12 | 3.1.6 | 6.1.6 | 6.2.1 | 6.2.4 | 7.1.5 | 7.6.2 | 7.7.1 | 7.7.2 |
| Template Based | ● | ● | ● | ● | ● | ● | ● | ● | 4 | 3.1.6 | 6.1.3 | | | | | |

FIG. 5C

| KEY FEATURES | COMPANY 1 SOFTWARE | COMPANY 2 SOFTWARE | COMPANY 3 SOFTWARE | COMPANY 4 SOFTWARE | COMPANY 5 SOFTWARE | COMPANY 6 SOFTWARE | COMPANY 7 SOFTWARE | COMPANY 8 SOFTWARE | TOTAL REQ. WEIGHT | BUSINESS REQUIREMENTS | | | | | | |
|---|---|---|---|---|---|---|---|---|---|---|---|---|---|---|---|---|
| WORKFLOW | | | | | | | | | | | | | | | | |
| GRAPHICAL WORKFLOW MODEL BUILDER | ● | ◐ | ● | ● | ◐ | ● | ● | ● | 1 | 7.4.4 | | | | | | |
| ALERTS / NOTIFICATIONS | ● | ◐ | ● | ● | ◐ | ● | ● | ● | 17 | 7.3.1 | 7.4.1 | 7.4.2 | 7.4.3 | 10.0.5 | | |
| REVIEW AND APPROVAL CYCLES | ● | ● | ● | ● | ◐ | ● | ● | ● | 9 | 5.0.1 | 7.2.1 | 7.4.4 | | | | |
| ACCESS CONTROL BASED | ● | ◐ | ● | ● | ◐ | ● | ● | ● | 18 | 4.0.1 | 4.0.2 | 4.0.4 | 4.0.5 | 10.0.2 | 10.0.7 | |
| DOCUMENT LIFE-CYCLE MANAGEMENT | ● | ◐ | ● | ● | ○ | ● | ● | ◐ | 18 | 3.2.2 | 6.1.2 | 6.2.2 | 7.1.6 | 7.7.1 | 7.7.3 | |
| SYSTEM TO SYSTEM INTEGRATION CAPABILITIES | ◐ | | | | | | | | 1 | 7.1.7 | | | | | | |
| COLLABORATION | | | | | | | | | | | | | | | | |
| THRESHOLDS FOR VOTING | ● | | ● | ● | ● | ● | ● | ● | | | | | | | | |
| TEAM-ROOM SUPPORT | ● | ◐ | ● | ● | ● | ● | ● | ● | 3 | 2.0.2 | | | | | | |
| INTEGRATION TOOLS | | | | | | | | | | | | | | | | |
| BUSINESS USER CONFIGURATION CAPABILITY | ● | | ● | ● | ◐ | ● | ● | ◐ | 4 | 7.4.4 | 7.2.2 | | | | | |
| DEVELOPER TOOL-SETS | ● | ◐ | ● | ● | ◐ | ● | ● | ◐ | 1 | 7.1.7 | | | | | | |
| DASHBOARD / REPORTING | ● | ◐ | ● | ● | ◐ | ● | ● | ● | 24 | 7.5.1 | 7.5.2 | 7.6.1 | 10.0.1 | 10.0.4 | 10.0.5 | 10.0.6 10.0.7 |
| RECORDS MANAGEMENT | | | | | | | | | | | | | | | | |
| AUTOMATED DECLARATIONS | ◐ | | ● | ● | ◐ | ● | ● | ● | 9 | 10.0.10 | 11.0.1 | 11.0.3 | | | | |
| LEGAL HOLDS | ◐ | ○ | ● | ● | ○ | ● | ● | ● | 20 | 10.0.10 | 3.1.7 | 11.0.2 | 11.0.3 | 11.0.4 | 11.0.5 | |

| KEY FEATURES | COMPANY 1 SOFTWARE | | COMPANY 2 SOFTWARE | | COMPANY 3 SOFTWARE | | COMPANY 4 SOFTWARE | | COMPANY 5 SOFTWARE | | COMPANY 6 SOFTWARE | | COMPANY 7 SOFTWARE | | COMPANY 8 SOFTWARE | | TOTAL REQ. WEIGHT | |
|---|---|---|---|---|---|---|---|---|---|---|---|---|---|---|---|---|---|---|
| CAPTURE | | | | | | | | | | | | | | | | | | BUSINESS REQ. |
| SCAN IMAGE | ● | 4 | ● | 3 | ● | 3 | ● | 4 | ● | 3 | ● | 3 | ● | 3 | ● | 3 | 4 | 2.0.4 | 2.0.5 |
| EMAIL INTEGRATION | ○ | 0 | ● | 6 | ● | 6 | ● | 8 | ○ | 2 | ● | 6 | ○ | 2 | ● | 6 | 8 | 1.0.3 | 2.0.1 |
| OFFICE / EXPLORER INTEGRATION | ● | 2.3 | ● | 2.3 | ● | 2.3 | ● | 3 | ● | 3 | ● | 2.3 | ● | 2.3 | ● | 2.25 | 3 | 2.0.2 | |
| CORE REPOSITORY | | | | | | | | | | | | | | | | | | | |
| TAXONOMY MANAGEMENT | ● | 18 | ● | 14 | ● | 18 | ● | 18 | ○ | 0 | ● | 14 | ● | 14 | ○ | 0 | 18 | 1.0.8 | 1.0.9 |
| COMPOUND DOCUMENT SUPPORT | ● | 2 | ● | 1.5 | ● | 2 | ● | 1.5 | ● | 0.5 | ● | 1.5 | ● | 1.5 | ● | 0.5 | 2 | 3.1.4 | 9.0.2 |
| CHECK IN/OUT & VERSION CONTROL | ● | 24 | ● | 24 | ● | 32 | ● | 24 | ● | 8 | ● | 24 | ● | 24 | ● | 24 | 32 | 1.0.1 | 1.0.4 |
| ACCESS CONTROL | ● | 7.3 | ● | 22 | ● | 22 | ● | 22 | ● | 7.3 | ● | 22 | ● | 22 | ● | 21.8 | 29 | 4.0.1 | 4.0.2 |
| ARCHIVING / HIERARCHICAL STORAGE MGT | ● | 8.3 | ● | 8.3 | ● | 11 | ● | 8.3 | ● | 2.8 | ● | 8.3 | ● | 8.3 | ● | 8.25 | 11 | 3.1.7 | 3.1.8 |
| FEDERATION | ● | 0.3 | ● | 0.8 | ● | 1 | ● | 1 | ○ | 0 | ● | 0.3 | ● | 1 | ● | 0.25 | 1 | 7.1.7 | |
| DISTRIBUTED ARCHITECTURE | ● | 3.8 | ● | 3.8 | ● | 3.8 | ● | 5 | ● | 1.3 | ● | 3.8 | ● | 3.8 | ● | 3.75 | 5 | 3.1.9 | |
| SEARCH | | | | | | | | | | | | | | | | | | | |
| FULL TEXT | ● | 3 | ● | 2.3 | ● | 2.3 | ● | 2.3 | ● | 2.3 | ● | 2.3 | ● | 2.3 | ● | 2.25 | 3 | 6.2.3 | |
| ATTRIBUTE / INDEX BASED | ● | 12 | ● | 9 | ● | 9 | ● | 9 | ● | 9 | ● | 9 | ● | 9 | ● | 9 | 12 | 3.1.6 | 6.1.6 |
| TEMPLATE BASED | ● | 4 | ● | 3 | ● | 3 | ● | 3 | ● | 3 | ● | 3 | ● | 3 | ● | 3 | 4 | 3.1.6 | 6.1.3 |
| WORKFLOW | | | | | | | | | | | | | | | | | | | |
| GRAPHICAL WORKFLOW MODEL BUILDER | ● | 0.8 | ● | 0.3 | ● | 0.8 | ● | 1 | ● | 0.3 | ● | 0.8 | ● | 0.8 | ● | 0.75 | 1 | 7.4.4 | |
| ALERTS / NOTIFICATIONS | ● | 13 | ● | 4.3 | ● | 13 | ● | 13 | ● | 4.3 | ● | 13 | ● | 13 | ● | 12.8 | 17 | 7.3.1 | 7.4.1 |
| REVIEW AND APPROVAL CYCLES | ● | 6.8 | ● | 6.8 | ● | 6.8 | ● | 6.8 | ● | 2.3 | ● | 6.8 | ● | 6.8 | ● | 6.75 | 9 | 5.0.1 | 7.2.1 |
| ACCESS CONTROL BASED | ● | 14 | ● | 14 | ● | 14 | ● | 14 | ● | 4.5 | ● | 14 | ● | 14 | ● | 13.5 | 18 | 4.0.1 | 4.0.2 |
| DOCUMENT LIFE-CYCLE MANAGEMENT | ● | 18 | ● | 14 | ● | 14 | ● | 14 | ● | 4.5 | ● | 14 | ● | 14 | ● | 13.5 | 18 | 3.2.2 | 6.1.2 |
| SYSTEM TO SYSTEM INTEGRATION CAPABILITIES | ● | 0.3 | ● | 0.3 | ● | 1 | ● | 1 | ○ | 0 | ● | 0.3 | ● | 0.8 | ○ | 0 | 1 | 7.1.7 | |
| COLLABORATION | | | | | | | | | | | | | | | | | | | |
| THRESHOLDS FOR VOTING | ● | 0 | ● | 0 | ● | 0 | ● | 0 | ● | 0 | ● | 0 | ● | 0 | ● | 0 | | | |
| TEAM-ROOM SUPPORT | ● | 3 | ● | 0.8 | ● | 2.3 | ● | 2.3 | ● | 3 | ● | 2.3 | ● | 2.3 | ● | 2.25 | 3 | 2.0.2 | |
| INTEGRATION TOOLS | | | | | | | | | | | | | | | | | | | |
| BUSINESS USER CONFIGURATION CAPABILITY | ● | 4 | ○ | 0 | ● | 3 | ● | 4 | ● | 3 | ● | 3 | ● | 3 | ● | 1 | 4 | 7.4.4 | 7.2.2 |
| DEVELOPER TOOL-SETS | ● | 1 | ● | 0.8 | ● | 0.8 | ● | 1 | ● | 0.8 | ● | 0.8 | ● | 0.8 | ● | 0.75 | 1 | 7.1.7 | |
| DASHBOARD / REPORTING | ● | 24 | ● | 6 | ● | 24 | ● | 24 | ○ | 0 | ● | 18 | ● | 24 | ● | 6 | 24 | 7.5.1 | 7.5.2 |
| RECORDS MANAGEMENT | | | | | | | | | | | | | | | | | | | |
| AUTOMATED DECLARATIONS | ● | 2.3 | ● | 2.3 | ● | 9 | ● | 9 | ○ | 0 | ● | 6.8 | ● | 9 | ● | 6.75 | 9 | 1.0.10 | 11.0.1 |
| LEGAL HOLDS | ● | 5 | ○ | 0 | ● | 20 | ● | 20 | ● | 5 | ● | 15 | ● | 20 | ● | 15 | 20 | 1.0.10 | 3.1.7 |
| | | | | | | | | | | | | | | | | | | |
| COMPOSITE SCORES: | | 180 | | 147 | | 222 | | 218 | | 70 | | 192 | | 202 | | 163 | | RANGE: | 70 |
| RELATIVE | | 111 | | 78 | | 153 | | 148 | | 0 | | 122 | | 133 | | 94 | | | |
| PERCENT | | 0.7 | | 0.5 | | 1 | | 0.97 | | 0 | | 0.8 | | 0.87 | | 0.61 | | | |
| FINAL SCORE (1-5): | | 3.89 | | 3.04 | | 5.00 | | 4.88 | | 1.00 | | 4.20 | | 4.48 | | 3.45 | | | |

601

| RANK | PRODUCT | SCORE |
|---|---|---|
| 1 | COMPANY 3 SOFTWARE | 5.00 |
| 2 | COMPANY 4 SOFTWARE | 4.88 |
| 3 | COMPANY 7 SOFTWARE | 4.48 |
| 4 | COMPANY 6 SOFTWARE | 4.20 |
| 5 | COMPANY 1 SOFTWARE | 3.89 |
| 6 | COMPANY 8 SOFTWARE | 3.45 |
| 7 | COMPANY 2 SOFTWARE | 3.04 |
| 8 | COMPANY 5 SOFTWARE | 1.00 |

SOFTWARE/HARDWARE RANKING

This application is a continuation application claiming priority to Ser. No. 12/276,480, filed Nov. 24, 2008.

FIELD

The present invention relates to a method and associated system for generating unbiased rankings for software/hardware products.

BACKGROUND

Recommending specific items typically comprises an inefficient process with little flexibility. Accordingly, there exists a need in the art to overcome at least some of the deficiencies and limitations described herein above.

SUMMARY

The present invention provides a method comprising:

receiving, by a computing system from a first entity, business requirements data and weighting factors, wherein said business requirements data comprises business requirements associated a software/hardware solution for performing specified functions associated with said first entity, wherein said weighting factors are associated with said business requirements data, and wherein each weighting factor of said weighting factors is associated with a different business requirement of said business requirements;

receiving, by said computing system from a second entity, a first list of software/hardware products associated with said specified functions, wherein said first entity differs from said second entity;

receiving, by said computing system from a third entity, assessment data associated with said software/hardware products of said first list, wherein said assessment data comprises an assessment rating for each software/hardware product of said first list, and wherein said third entity differs from said second entity and said first entity;

associating, by said computing system, said business requirements and said weighting factors with product features of said software/hardware products of said first list;

calculating, by said computing system, total requirement weighting factors for said product features, wherein each total requirement weighting factor of said total requirement weighting factors is associated with a different feature of said features; and storing, by said computing system, said total requirement weighting factors.

The present invention provides a computing system comprising a processor coupled to a computer-readable memory unit, said memory unit comprising instructions that when executed by the processor implements a ranking method, said method comprising:

receiving, by said computing system from a first entity, business requirements data and weighting factors, wherein said business requirements data comprises business requirements associated a software/hardware solution for performing specified functions associated with said first entity, wherein said weighting factors are associated with said business requirements data, and wherein each weighting factor of said weighting factors is associated with a different business requirement of said business requirements;

receiving, by said computing system from a second entity, a first list of software/hardware products associated with said specified functions, wherein said first entity differs from said second entity;

receiving, by said computing system from a third entity, assessment data associated with said software/hardware products of said first list, wherein said assessment data comprises an assessment rating for each software/hardware product of said first list, and wherein said third entity differs from said second entity and said first entity;

associating, by said computing system, said business requirements and said weighting factors with product features of said software/hardware products of said first list;

calculating, by said computing system, total requirement weighting factors for said product features, wherein each total requirement weighting factor of said total requirement weighting factors is associated with a different feature of said features; and storing, by said computing system, said total requirement weighting factors.

The present invention advantageously provides a simple method and associated system capable of recommending specific items.

BRIEF DESCRIPTION OF THE DRAWINGS

FIG. 3 illustrates an example of business requirements retrieved in the algorithm of FIG. 2, in accordance with embodiments of the present invention.

FIG. 4 illustrates an example of relative weights retrieved in the algorithm of FIG. 2, in accordance with embodiments of the present invention.

FIG. 5b illustrates an implementation example for executing a first step in the algorithm of FIG. 2, in accordance with embodiments of the present invention.

FIG. 5c illustrates an example for executing a second step in the algorithm of FIG. 2, in accordance with embodiments of the present invention.

FIG. 5f illustrates an example for executing a fifth step in the algorithm of FIG. 2, in accordance with embodiments of the present invention.

DETAILED DESCRIPTION

Figure 1:
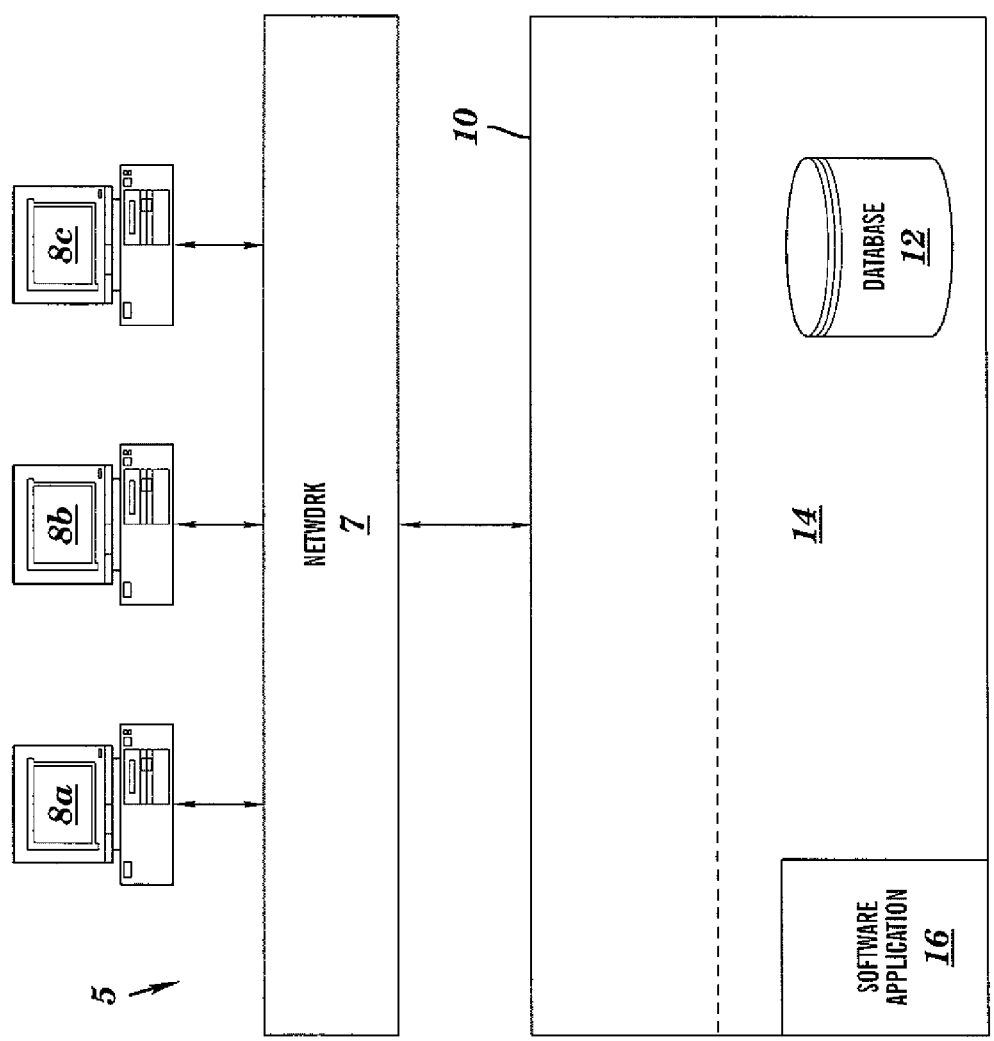
FIG. 1 illustrates a system for generating unbiased rankings for software/hardware products, in accordance with embodiments of the present invention.

FIG. 1 illustrates a system 5 for generating unbiased rankings for software/hardware products, in accordance with embodiments of the present invention. System 5 of FIG. 1 comprises a computing apparatus 8a and a computing apparatus 8b, and a computing apparatus 8c connected to a computing system 10 through a network 7. Network 7 may comprise any type of network including, inter alia, a local area network, (LAN), a wide area network (WAN), the Internet, etc. Computing apparatus 8a, 8b, and 8c may comprise any type of computing apparatus including, inter alia, a personal computer, a laptop computer, a computer terminal, etc. Computing apparatus 8a, 8b, and 8c may comprise a single computing apparatus or a plurality of computing apparatuses. Computing apparatus 8a, 8b, and 8c is used by users from a first entity for requesting a software/hardware solution for performing specified functions. Computing apparatus 8b is used by users from a second (and unrelated) entity for entering data required for providing an unbiased software/hardware solution for performing the specified functions. Computing apparatus 8c is used by users from a third (and unrelated) entity for entering data (e.g., assessment data) required for providing an unbiased software/hardware solution for performing the specified functions.

Computing system 10 may comprise any type of computing system(s) including, inter alia, a personal computer (PC), a server computer, a database computer, etc. Computing system 10 is used to retrieve a request for providing a software/hardware solution for performing specified functions and generating an unbiased ranked list of software/hardware products associated with performing the specified functions. Computing system 10 comprises a memory system 14. Memory system 14 may comprise a single memory system. Alternatively, memory system 14 may comprise a plurality of memory systems. Memory system 14 comprises a software application 16 and a database 12. Database 12 comprises all data associated with generating the ranked list of software/hardware products. The software/hardware products may comprise any type of software and/or hardware products including, inter alia, software applications, operating systems, hardware drivers, memory devices, microprocessors, input/output devices, video cards, data acquisition and control systems, programmable logic controllers (PLC) etc.

Software application 16 performs a numerical comparison associated with a 'fit' of various software/hardware products against specified business requirements. The numerical comparison allows for a bias-neutral numerical comparison of the software/hardware products (e.g., if the company recommending the various software/hardware products also manufactures some of the software/hardware products). The business requirements may be obtained from a first entity (e.g., a business questioner) through standard business analyst activities. The business requirements (e.g., in a list format) are then rated by importance (e.g., using ratings of high, medium, and low). The ratings may be adjusted to fit a typical bell curve. Once the requirements are rated, they are matched against a feature set comparison chart (e.g., assessment data assessing various software/hardware products). The comparison chart may be created by utilizing industry accepted neutral reports such as, inter alia, the Gartner report, ECM Magic Quadrant, Forrester ECM suite comparison study, etc. The reports are used to generate a Harvey ball chart rating each software/hardware product as a 0, 0.25, 0.50, 0.75, or 1 for each feature set. The requirements are then matched to the feature sets that cover them. Any requirements that do not fall any under feature sets are called out as such separately. Software application 16 calculates a sum of each requirement's weight by feature set for each vendor (i.e., manufacturer for the software/hardware products). Additionally, a sum of all feature set scores is calculated for each vendor. The aforementioned process generates a numerical score for assessing how well each software/hardware product's feature set meets the needs of the business requirements (i.e., taking into consideration the relative importance of each business requirement). As the requirements are ranked in conjunction with the business users and without knowledge of what feature sets they apply to, the possibility of bias is virtually eliminated.

Figure 2A:
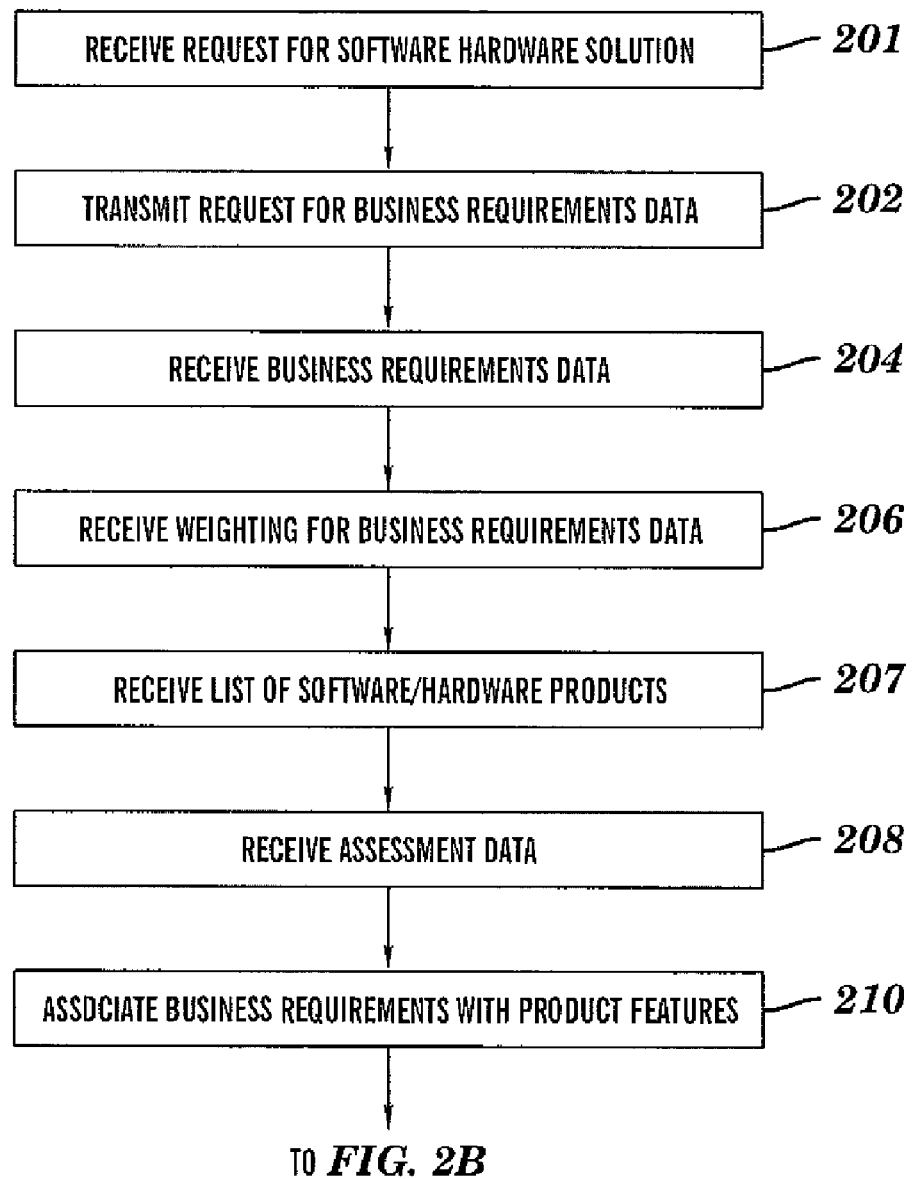
FIG. 2 which includes FIG. 2A
FIG. 2B illustrates a flowchart describing an algorithm used by the system of FIG. 1 for generating unbiased rankings for software/hardware products, in accordance with embodiments of the present invention.
Figure 2B:
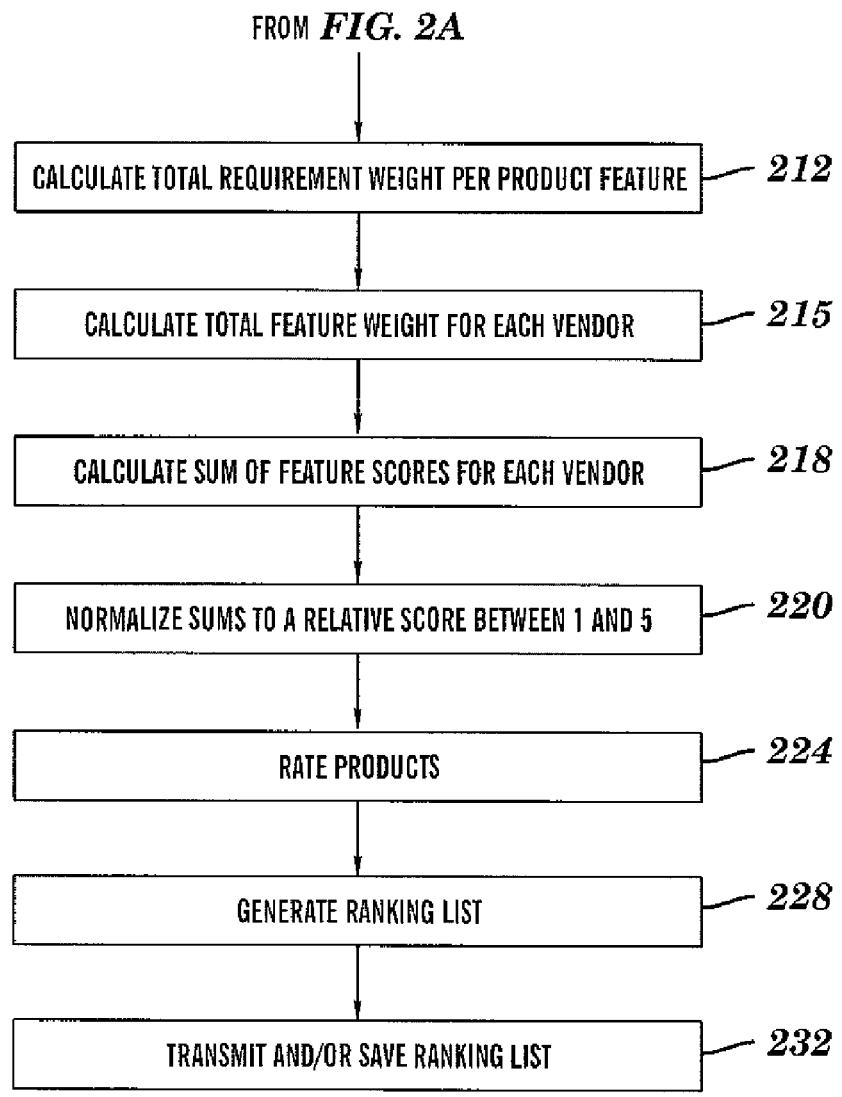

FIG. 2 which includes FIG. 2A and FIG. 2B illustrates a flowchart describing an algorithm used by system 5 of FIG. 1 for generating unbiased rankings for software/hardware products, in accordance with embodiments of the present invention. In step 201, a computing system (e.g., computing system 10 of FIG. 1) receives (i.e., from a first entity such as a business or company) a request (e.g., via computing apparatus 8a of FIG. 1) for providing a software/hardware solution for performing specified functions associated with the first entity. In step 202, computing system requests (i.e., in response to said request received in step 201), business requirements data comprising business requirements associated with the specified functions of step 201. In step 204, the computing system receives (i.e., from the first entity) the requested business requirements data. In step 206, the computing system receives (i.e., from said first entity) weighting factors associated with the business requirements data. Each weighting factor is associated with a different business requirement of the business requirements. In step 207, the computing system receives (i.e., from a second entity unrelated to the first entity) a list of software/hardware products associated with performing the specified functions. In step 208, the computing system receives (i.e., from a third entity or vendor unrelated to the first entity or the second entity) unbiased assessment data associated with the software/hardware products of the list. The assessment data comprises an assessment rating for each software/hardware product of the list. The assessment data may be derived from any type of third party assessments such as, inter alia, the Gartner report, ECM Magic Quadrant, Forrester ECM suite comparison study, etc. In step 210, the computing system associates the business requirements from step 204 and the weighting factors from step 206 with product features of the software/hardware products of list received in step 207. In step 212, the computing system calculates total requirement weighting factors for each of the product features. Each total requirement weighting factor may be calculated by adding groups of weighting factors associated with each product feature. In step 215, the computing system calculates total feature weighting factors for the software/hardware products. Each total feature weighting factor is associated with a different software/hardware product. Each said total feature weighting factor is calculated by multiplying an assessment rating for a software/hardware product with an associated total requirement weighting factor calculated in step 212. Each assessment rating may be converted into a percentage value before the multiplying (i.e., before step 215 is executed). In step 216, the computing system calculates total feature scores for the software/hardware products. Each total feature score is calculated by adding groups of the total feature weighting factors. Each said different software/hardware product is associated with a different group. In step 220, the computing system converts the total feature scores into normalized scores. The total feature scores may be converted into normalized scores by the following steps:

1. Calculating a difference between an associated total feature score and a minimum total feature score of the total feature scores.
2. Calculating a quotient by dividing the difference (i.e., from step 1) with a range of the total feature scores.

3. Calculating a product by multiplying the quotient (i.e., from step 2) by four.

4. Adding one to the product of step 3.

In step 224, the computing system rates or ranks (i.e., based on the normalized scores) the software/hardware products. In step 228, the computing system generates (i.e., based on the ratings) a ranking list comprising rankings for each software/hardware product. In step 232, the computing system stores and/or transmits the ranking list to the first entity.

FIGS. 3-6 illustrate an example of implementation for executing the algorithm of FIG. 2 for generating unbiased rankings for software/hardware products, in accordance with embodiments of the present invention.

FIG. 3 illustrates a chart 300 comprising an implementation example of business requirements 302 retrieved in step 204 in the algorithm of FIG. 2, in accordance with embodiments of the present invention. The business requirements 302 comprise identification numbers 1.0.1 ... 1.0.9. Each of the business requirements comprises a description 304 associated with one of identification numbers 1.0.1 ... 1.0.9. For example, identification number 1.0.1 comprises a description 304 of "An authorized user shall be able to manage thousands of files and determine which are most current".

FIG. 4 illustrates a chart 400 comprising an implementation example of relative weights 404 retrieved in step 206 in the algorithm of FIG. 2, in accordance with embodiments of the present invention. Relative weights 404 are associated with business requirements 302. For example, business requirements 302 identification number 1.0.9 is associated with a relative weight 404 of "3" and comprises a prioritization ration 406 of "Essential requirement ... Binders". Business management and staff personal may generate and associate a numerical relative weight 404 to each of business requirements 302. The business management and staff personal generate numerical relative weights 404 without regard to a technology used for a final solution thereby ensuring that the weightings are not influenced by a choice of vendors.

Figure 5A:
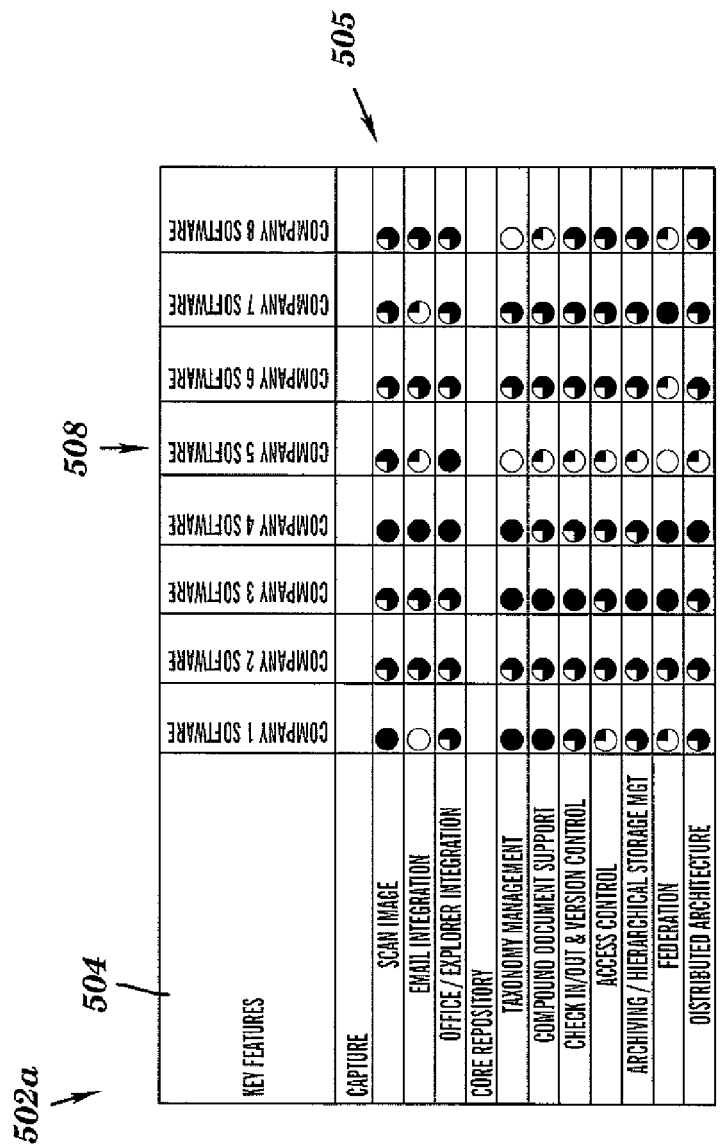
FIG. 5a illustrates an example of third party assessments retrieved in the algorithm of FIG. 2, in accordance with embodiments of the present invention.

FIG. 5a illustrates a chart 502a comprising an implementation example of third party assessments 505 retrieved in step 208 in the algorithm of FIG. 2, in accordance with embodiments of the present invention. Chart 502a is illustrated as a spreadsheet format. Note that any type of format may be used. Key features 504 for software products/manufacturers 508 are illustrated in the first column of chart 502a (e.g., scan image, Email integration, etc). Third party assessments 505 (e.g., reports and evaluations) are utilized to rate each vendor's product. For example, industry reports such as, inter alia, the Forrester report or the Gartner Group report provide unbiased evaluations of many products and may be utilized to rate products. In the implementation example illustrated in FIG. 5a, Harvey balls (i.e., illustrated as percentage values) are used to rate each feature for each product. A filled in circle represents 100% (i.e., a best possible score) while an empty circle represents 0% (i.e., a worst possible score). The ratings used in the implementation example illustrated in FIG. 5a are 0%, 25%, 50%, 75%, and 100%. For example:

1. An assessment rating for a key feature/requirement of scan image for company 1 software is illustrated as a full filled circle indicating an assessment rating of 100% (i.e., a best rating).

2. An assessment rating for a key feature/requirement of taxonomy management for company 2 software is illustrated as a ¾ filled circle indicating an assessment rating of 75%.

FIG. 5b illustrates a modified chart 502b comprising an implementation example of executing step 210 in the algorithm of FIG. 2, in accordance with embodiments of the present invention. Modified chart 502b has been modified from chart 502a of FIG. 5a. Chart 502b comprises business requirements 510 associated with product key features 504. Not all business requirements (e.g., business requirements 510) will be linked or associated with each product key features 504. Therefore each of business requirements 510 should be considered equal across all vendors/manufacturers. For example, a business requirement 2.0.1 may be associated with all the content management repositories and is considered to be a basic requirement that is not covered by a key product feature. Since all vendors/companies support this functionality, the business requirement would have no effect on the relative scores of the vendors and may be left out without changing an outcome.

FIG. 5c illustrates a modified chart 502c comprising an implementation example of executing step 212 in the algorithm of FIG. 2, in accordance with embodiments of the present invention. Modified chart 502c has been modified from chart 502b of FIG. 5b. Chart 502c comprises a total (i.e., a sum) required weight 514 for each of key product features 504. Step 212 of FIG. 2 retrieves all requirement weights (e.g., relative weights 404 from FIG. 4) associated with each key product feature 504 and sums their values. Each total requirement weighting factor is calculated by adding groups of weighting factors associated with each product feature.

Figure 5D:
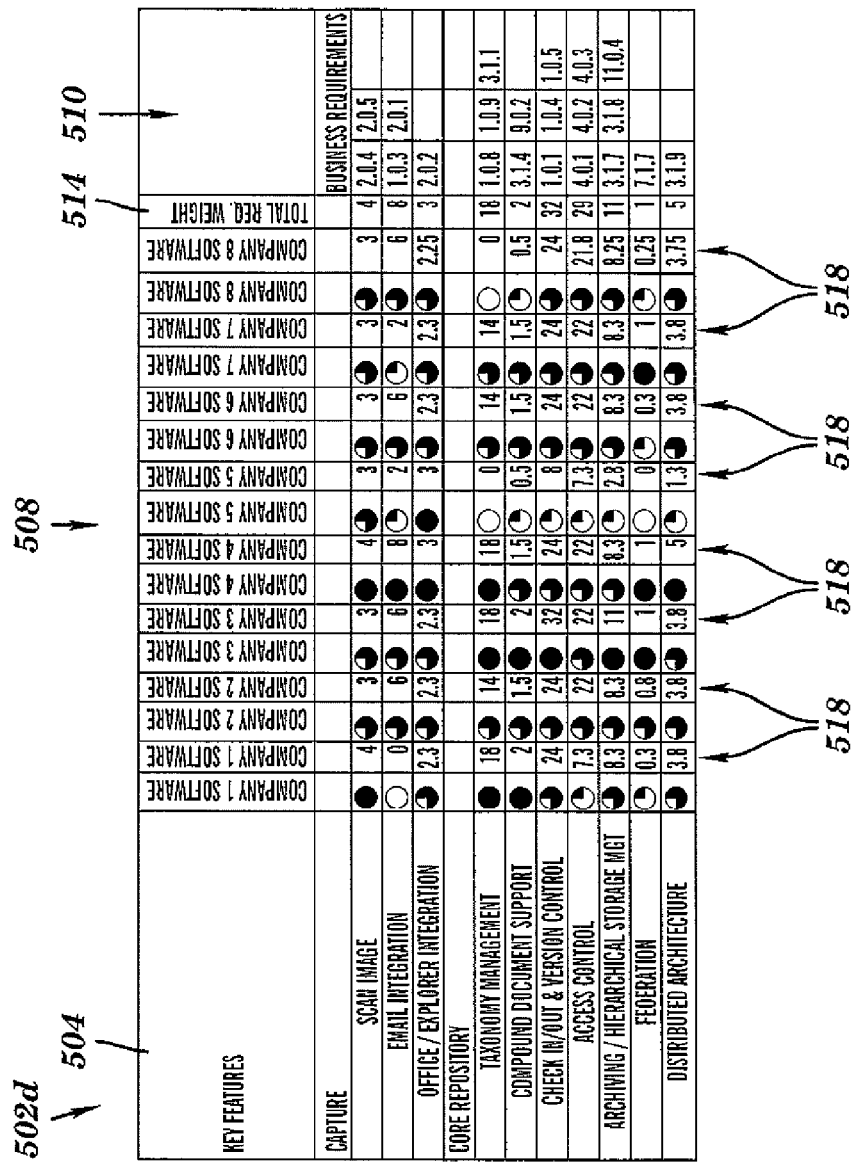
FIG. 5d illustrates an example for executing a third step in the algorithm of FIG. 2, in accordance with embodiments of the present invention.

FIG. 5d illustrates a modified chart 502d comprising an implementation example of executing step 215 in the algorithm of FIG. 2, in accordance with embodiments of the present invention. Modified chart 502d has been modified from chart 502c of FIG. 5c. Chart 502d illustrates total feature weights 516. Total feature weights are calculated by multiplying a total requirement weight 514 for each key product feature by each vendors' score for that feature (i.e., assessment rating. Each total feature weight 516 is represented by a value between 0% and 100% (e.g., illustrated as Harvey balls). The following steps describe the total feature weight are calculations:

1. A Harvey ball value is converted into a percent value.

2. The percent value is multiplied by an associated total requirement weight 514 to arrive at a vendor's individual score for that key product feature.

Figure 5E:
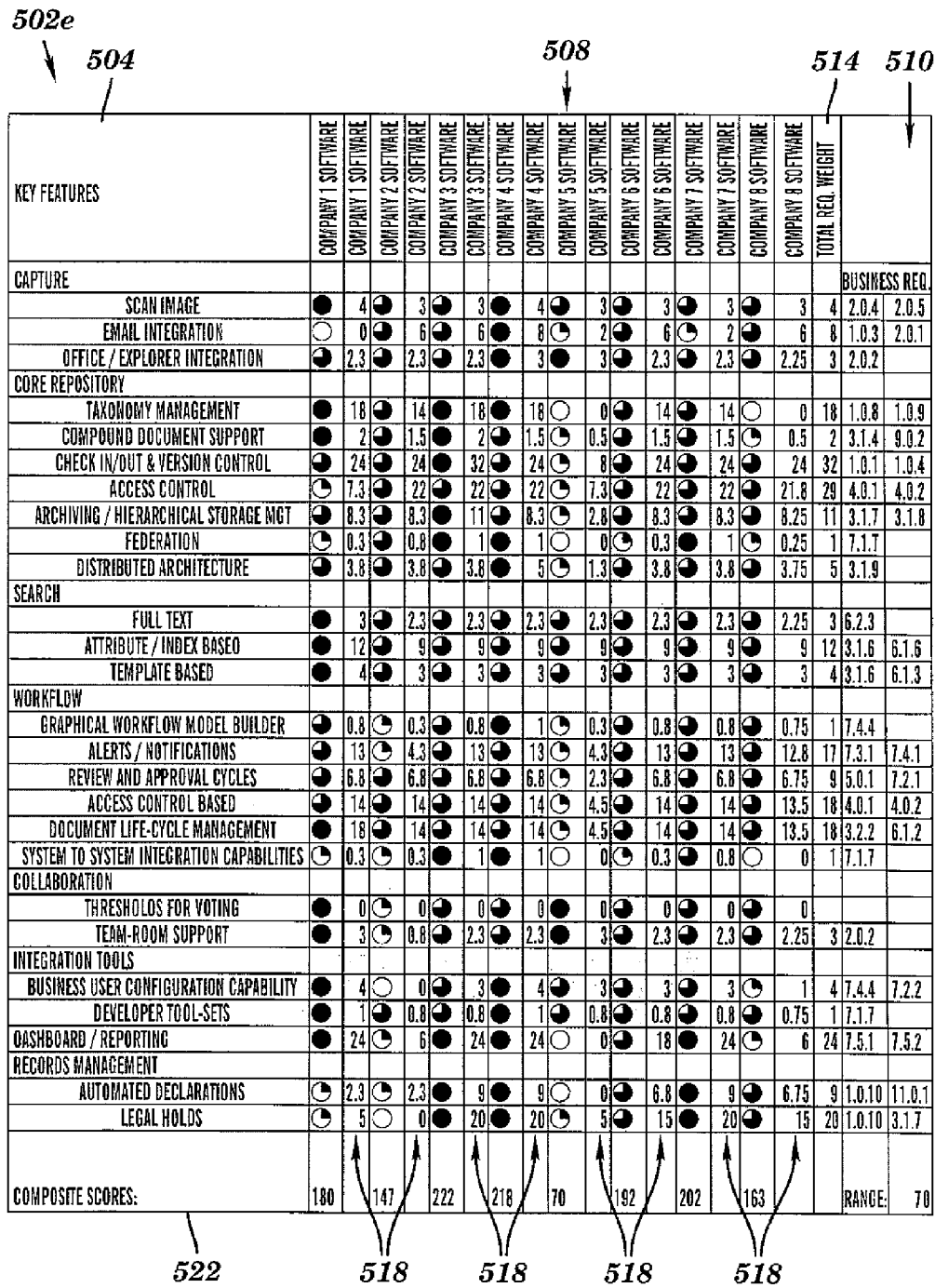
FIG. 5e illustrates an example for executing a fourth step in the algorithm of FIG. 2, in accordance with embodiments of the present invention.

FIG. 5e illustrates a modified chart 502e comprising an implementation example of executing step 216 in the algorithm of FIG. 2, in accordance with embodiments of the present invention. Modified chart 502e has been modified from chart 502d of FIG. 5d. Chart 502e illustrates a sum of feature scores 522 (composite scores) for each vendor/company. The values for each product feature for each vendor are summed up to calculate each sum of feature scores 522 (composite scores) for each vendor/company.

FIG. 5f illustrates a modified chart 502f comprising an implementation example of executing step 220 in the algorithm of FIG. 2, in accordance with embodiments of the present invention. Modified chart 502f has been modified from chart 502e of FIG. 5e. Chart 502f illustrates normalized (final) scores 530 for each vendor/company. Normalized (final) scores 530 are normalized into a range between 1 and 5 for easy comparison. Sum of feature scores 522 (composite scores) may be converted into normalized scores by the following steps:

1. Calculating a difference between an associated total feature score 522 and a minimum total feature score of the total feature scores.

2. Calculating a quotient by dividing the difference (i.e., from step 1) with a range of the total feature scores 532 (e.g., 70).

3. Calculating a product by multiplying the quotient (i.e., from step 2) by four.

4. Adding one to the product of step 3.

Figure 6:
FIG. 6 illustrates a ranking list generated by the algorithm of FIG. 2, in accordance with embodiments of the present invention.

FIG. 6 illustrates a ranking list 601 generated in step 228 of the algorithm of FIG. 2, in accordance with embodiments of the present invention. Ranking list comprises rankings for each software/hardware product from each vendor/company.

Figure 7:
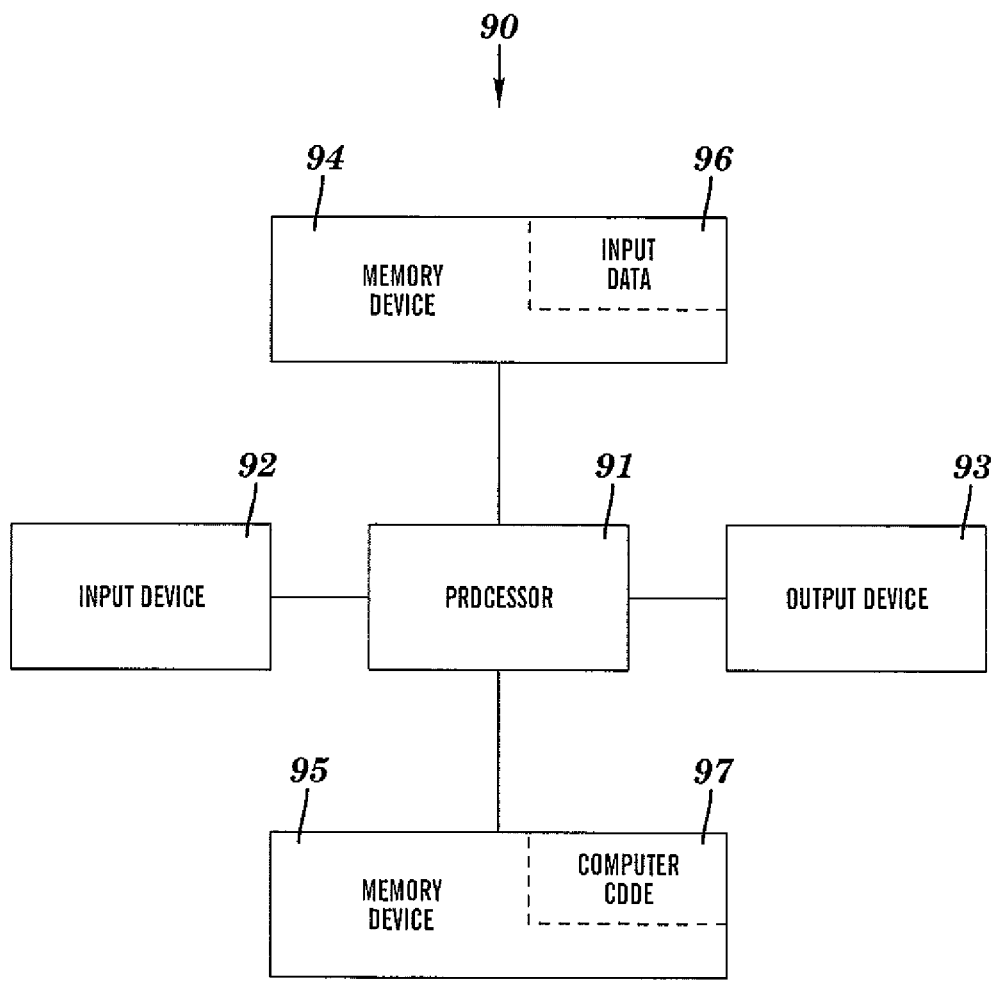
FIG. 7 illustrates a computer apparatus used for generating unbiased rankings for software/hardware products, in accordance with embodiments of the present invention.

FIG. 7 illustrates a computer apparatus 90 (e.g., computing system 10 of FIG. 1) used for generating unbiased rankings for software/hardware products, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for generating unbiased rankings for software/hardware products. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to for generate unbiased rankings for software/hardware products. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating unbiased rankings for software/hardware products. In another embodiment, the invention provides a business method that performs the process steps of the invention on a subscription, advertising, and/or fee basis. That is, a service provider, such as a Solution Integrator, could offer to generate unbiased rankings for software/hardware products. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

receiving, by a computing system from a first entity, business requirements data with identification numbers and associated descriptions and weighting factors, wherein said business requirements data comprises business requirements associated with a software/hardware solution for performing specified functions associated with said first entity, wherein said weighting factors are associated with said business requirements data, and wherein each weighting factor of said weighting factors is associated with a different business requirement of said business requirements;

generating, by said computing system based on said business requirements data, a prioritization chart comprising said business requirements associated with said weighting factors, a prioritization rationale, and a user command description;

receiving, by said computing system from a second entity, a first list of software/hardware products associated with said specified functions, wherein said first entity differs from said second entity;

receiving, by said computing system from a third entity, assessment data associated with said software/hardware products of said first list, wherein said assessment data comprises an assessment rating for each software/hardware product of said first list, wherein said assessment data comprises key product features for each software/hardware product and software products manufacturers of said first list, and wherein said third entity differs from said second entity and said first entity;

generating, by said computing system, a first chart comprising said key product features with respect to said software products manufacturers and percentage values representing ratings for said key product features;

calculating, by said computing system, total requirement weighting factors for said product features, wherein each total requirement weighting factor of said total requirement weighting factors is associated with a different feature of said key product features;

generating, by said computing system, a second chart comprising said key product features with respect to said software products manufacturers, said percentage values, said total requirement weighting factors, and numerical representations of said business requirements;

calculating, by said computing system, total feature weighting factors for said software/hardware products, wherein each total feature weighting factor of said total feature weighting factors is associated with a different software/hardware product of said software/hardware products, and wherein each said total feature weighting factor is based on a function of each said assessment rating and an associated total requirement weighting factor of said total requirement weighting factors;

generating, by said computing system, a third chart comprising a modified version of said second chart, wherein said third chart comprises said total feature weighting factors associated with each of said key product features and each of said percentage values;

calculating, by said computing system, total feature scores for said software/hardware products, wherein each total feature score of said total feature scores is calculated by adding groups of said total feature weighting factors, and wherein each said different software/hardware product is associated with a different group of said groups;

calculating, by said computing system, normalized scores associated with each total feature score of said total feature scores, wherein said calculating each normalized score of said normalized scores comprises:
calculating a difference between said each total feature score of said total feature scores and a minimum total feature score of said total feature scores;
calculating a quotient by dividing said difference with a range of said total feature scores;
calculating a product by multiplying said quotient by four; and
adding one to said product;

rating, by said computing system based on said normalized scores, said software/hardware products;

generating, by said computing system, a fourth chart comprising a modified version of said third chart, wherein said fourth chart comprises, said total feature weighting factors associated with each of said key product features, each of said percentage values, and said normalized scores;

generating, by said computing system based on said rating, a ranking list comprising rankings for each said software/hardware product of said software/hardware products associated with said normalized scores; and transmitting, by said computing system to said first entity, said ranking list.

2. The method of claim 1, wherein said calculating each said total feature weighting factor comprises multiplying each said assessment rating with said associated total requirement weighting factor of said total requirement weighting factors.

3. The method of claim 2, wherein each said assessment rating is converted into a percentage value before said multiplying.

4. The method of claim 1, further comprising:
presenting, by said computing system to said second entity in a spreadsheet format, said business requirements data, said weighting factors, said first list of software/hardware products, said assessment data, said total requirement weighting factors, said total features weighting factors, said total feature scores, and said normalized scores.

5. The method of claim 1, wherein said business requirements are associated with said first entity.

6. The method of claim 1, wherein said weighting factors are not associated with said software/hardware products of said first list.

7. The method of claim 1, further comprising:
presenting, by said computing system to said second entity, each said assessment rating for each software/hardware product of said first list, wherein each said assessment rating is presented as a Harvey ball chart.

8. The method of claim 1, wherein each said total requirement weighting factor of said total requirement weighting factors is calculated by adding a group of weighting factors of said weighting factors, and wherein each said group of weighting factors is associated with an associated feature of said features.

9. A process for supporting computing infrastructure, said process comprising providing at least one support service for at least one of creating, integrating, hosting, maintaining, and deploying computer-readable code in a computer system comprising a computer processor, wherein said computer processor, in response to said providing, carries out instructions contained in said code causing said computer system to perform a method comprising:

receiving, by said computing system from a first entity, business requirements data with identification numbers and associated descriptions and weighting factors, wherein said business requirements data comprises business requirements associated with a software/hardware solution for performing specified functions associated with said first entity, wherein said weighting factors are associated with said business requirements data, and wherein each weighting factor of said weighting factors is associated with a different business requirement of said business;

generating, by said computing system based on said business requirements data, a prioritization chart comprising said business requirements associated with said weighting factors, a prioritization rationale, and a user command description;

receiving, by said computing system from a second entity, a first list of software/hardware products associated with said specified functions, wherein said first entity differs from said second entity;

receiving, by said computing system from a third entity, assessment data associated with said software/hardware products of said first list, wherein said assessment data comprises an assessment rating for each software/hardware product of said first list, wherein said assessment data comprises key product features for each software/hardware product and software products manufacturers of said first list, and wherein said third entity differs from said second entity and said first entity;

generating, by said computing system, a first chart comprising said key product features with respect to said software products manufacturers and percentage values representing ratings for said key product features;

calculating, by said computing system, total requirement weighting factors for said product features, wherein each total requirement weighting factor of said total requirement weighting factors is associated with a different feature of said key product features;

generating, by said computing system, a second chart comprising said key product features with respect to said software products manufacturers, said percentage values, said total requirement weighting factors, and numerical representations of said business requirements;

calculating, by said computing system, total feature weighting factors for said software/hardware products, wherein each total feature weighting factor of said total feature weighting factors is associated with a different software/hardware product of said software/hardware products, and wherein each said total feature weighting factor is based on a function of each said assessment rating and an associated total requirement weighting factor of said total requirement weighting factors;

generating, by said computing system, a third chart comprising a modified version of said second chart, wherein said third chart comprises said total feature weighting factors associated with each of said key product features and each of said percentage values;

calculating, by said computing system, total feature scores for said software/hardware products, wherein each total feature score of said total feature scores is calculated by adding groups of said total feature weighting factors, and wherein each said different software/hardware product is associated with a different group of said groups;

calculating, by said computing system, normalized scores associated with each total feature score of said total feature scores, wherein said calculating each normalized score of said normalized scores comprises:
- calculating a difference between said each total feature score of said total feature scores and a minimum total feature score of said total feature scores;
- calculating a quotient by dividing said difference with a range of said total feature scores;
- calculating a product by multiplying said quotient by four; and
- adding one to said product;

rating, by said computing system based on said normalized scores, said software/hardware products;

generating, by said computing system, a fourth chart comprising a modified version of said third chart, wherein said fourth chart comprises, said total feature weighting factors associated with each of said key product features, each of said percentage values, and said normalized scores;

generating, by said computing system based on said rating, a ranking list comprising rankings for each said software/hardware product of said software/hardware products associated with said normalized scores; and transmitting, by said computing system to said first entity, said ranking list.

10. A computer program product, comprising a computer readable storage device storing a computer readable program code, said computer readable program code comprising an algorithm that when executed by a computer processor of a computing system implements a method, said method comprising:

receiving, by said computing system from a first entity, business requirements data with identification numbers and associated descriptions and weighting factors, wherein said business requirements data comprises business requirements associated with a software/hardware solution for performing specified functions associated with said first entity, wherein said weighting factors are associated with said business requirements data, and wherein each weighting factor of said weighting factors is associated with a different business requirement of said business requirements;

generating, by said computing system based on said business requirements data, a prioritization chart comprising said business requirements associated with said weighting factors, a prioritization rationale, and a user command description;

receiving, by said computing system from a second entity, a first list of software/hardware products associated with said specified functions, wherein said first entity differs from said second entity;

receiving, by said computing system from a third entity, assessment data associated with said software/hardware products of said first list, wherein said assessment data comprises an assessment rating for each software/hardware product of said first list, wherein said assessment data comprises key product features for each software/hardware product and software products manufacturers of said first list, and wherein said third entity differs from said second entity and said first entity;

generating, by said computing system, a first chart comprising said key product features with respect to said software products manufacturers and percentage values representing ratings for said key product features;

calculating, by said computing system, total requirement weighting factors for said product features, wherein each total requirement weighting factor of said total requirement weighting factors is associated with a different feature of said key product features;

generating, by said computing system, a second chart comprising said key product features with respect to said software products manufacturers, said percentage values, said total requirement weighting factors, and numerical representations of said business requirements;

calculating, by said computing system, total feature weighting factors for said software/hardware products, wherein each total feature weighting factor of said total feature weighting factors is associated with a different software/hardware product of said software/hardware products, and wherein each said total feature weighting factor is based on a function of each said assessment rating and an associated total requirement weighting factor of said total requirement weighting factors;

generating, by said computing system, a third chart comprising a modified version of said second chart, wherein said third chart comprises said total feature weighting factors associated with each of said key product features and each of said percentage values;

calculating, by said computing system, total feature scores for said software/hardware products, wherein each total feature score of said total feature scores is calculated by adding groups of said total feature weighting factors, and wherein each said different software/hardware product is associated with a different group of said groups;

calculating, by said computing system, normalized scores associated with each total feature score of said total feature scores, wherein said calculating each normalized score of said normalized scores comprises:
- calculating a difference between said each total feature score of said total feature scores and a minimum total feature score of said total feature scores;
- calculating a quotient by dividing said difference with a range of said total feature scores;
- calculating a product by multiplying said quotient by four; and
- adding one to said product;

rating, by said computing system based on said normalized scores, said software/hardware products;

generating, by said computing system, a fourth chart comprising a modified version of said third chart, wherein said fourth chart comprises, said total feature weighting factors associated with each of said key product features, each of said percentage values, and said normalized scores;

generating, by said computing system based on said rating, a ranking list comprising rankings for each said software/hardware product of said software/hardware products associated with said normalized scores; and transmitting, by said computing system to said first entity, said ranking list.

11. A computing system comprising a processor coupled to a computer-readable memory unit, said memory unit comprising instructions that when executed by the processor implements a ranking method, said method comprising:

receiving, by said computing system from a first entity, business requirements data with identification numbers and associated descriptions and weighting factors, wherein said business requirements data comprises business requirements associated a software/hardware solution for performing specified functions associated with said first entity, wherein said weighting factors are associated with said business requirements data, and wherein each weighting factor of said weighting factors is associated with a different business requirement of said business requirements;
generating, by said computing system based on said business requirements data, a prioritization chart comprising said business requirements associated with said weighting factors, a prioritization rationale, and a user command description;
    receiving, by said computing system from a second entity, a first list of software/hardware products associated with said specified functions, wherein said first entity differs from said second entity;
    receiving, by said computing system from a third entity, assessment data associated with said software/hardware products of said first list, wherein said assessment data comprises an assessment rating for each software/hardware product of said first list, wherein said assessment data comprises key product features for each software/hardware product and software products manufacturers of said first list, and wherein said third entity differs from said second entity and said first entity;
    generating, by said computing system, a first chart comprising said key product features with respect to said software products manufacturers and percentage values representing ratings for said key product features;
    calculating, by said computing system, total requirement weighting factors for said product features, wherein each total requirement weighting factor of said total requirement weighting factors is associated with a different feature of said key product features;
    generating, by said computing system, a second chart comprising said key product features with respect to said software products manufacturers, said percentage values, said total requirement weighting factors, and numerical representations of said business requirements;
    calculating, by said computing system, total feature weighting factors for said software/hardware products, wherein each total feature weighting factor of said total feature weighting factors is associated with a different software/hardware product of said software/hardware products, and wherein each said total feature weighting factor is based on a function of each said assessment rating and an associated total requirement weighting factor of said total requirement weighting factors;
    generating, by said computing system, a third chart comprising a modified version of said second chart, wherein said third chart comprises said total feature weighting factors associated with each of said key product features and each of said percentage values;
    calculating, by said computing system, total feature scores for said software/hardware products, wherein each total feature score of said total feature scores is calculated by adding groups of said total feature weighting factors, and wherein each said different software/hardware product is associated with a different group of said groups;
    calculating, by said computing system, normalized scores associated with each total feature score of said total feature scores, wherein said calculating each normalized score of said normalized scores comprises:
        calculating a difference between said each total feature score of said total feature scores and a minimum total feature score of said total feature scores;
        calculating a quotient by dividing said difference with a range of said total feature scores;
        calculating a product by multiplying said quotient by four; and
        adding one to said product;
    rating, by said computing system based on said normalized scores, said software/hardware products;
    generating, by said computing system, a fourth chart comprising a modified version of said third chart, wherein said fourth chart comprises, said total feature weighting factors associated with each of said key product features, each of said percentage values, and said normalized scores;
    generating, by said computing system based on said rating, a ranking list comprising rankings for each said software/hardware product of said software/hardware products associated with said normalized scores; and
    transmitting, by said computing system to said first entity, said ranking list.

12. The computing system of claim 11, wherein said calculating each said total feature weighting factor comprises multiplying each said assessment rating with said associated total requirement weighting factor of said total requirement weighting factors.

13. The computing system of claim 12, wherein each said assessment rating is converted into a percentage value before said multiplying.

14. The computing system of claim 11, wherein said business requirements are associated with said first entity.

15. The computing system of claim 11, wherein said weighting factors are not associated with said software/hardware products of said first list.

16. The computing system of claim 11, wherein said method further comprises:
    presenting, by said computing system to said second entity, each said assessment rating for each software/hardware product of said first list, wherein each said assessment rating is presented as a Harvey ball chart.

* * * * *